United States Patent [19]

Idel et al.

[11] 4,450,266

[45] May 22, 1984

[54] USE OF SILOXANES FOR THE MODIFICATION OF HIGH MOLECULAR WEIGHT P-POLYPHENYLENE SULPHIDES

[75] Inventors: Karsten Idel; Dieter Freitag, both of Krefeld; Josef Merten, Korschenbroich, all of Fed. Rep. of Germany

[73] Assignee: Bayer Aktiengesellschaft, Leverkusen, Fed. Rep. of Germany

[21] Appl. No.: 465,012

[22] Filed: Feb. 8, 1983

[30] Foreign Application Priority Data

Feb. 19, 1982 [DE] Fed. Rep. of Germany ....... 3205993

[51] Int. Cl.$^3$ .............................................. C08K 5/54

[52] U.S. Cl. .................................... 524/265; 524/267; 525/446; 525/464; 525/474

[58] Field of Search ....................... 525/474, 446, 464; 524/265, 267

[56] References Cited

U.S. PATENT DOCUMENTS

| | | | |
|---|---|---|---|
| 4,021,596 | 5/1977 | Bailey | 428/375 |
| 4,140,671 | 2/1979 | Cohen | 524/412 |
| 4,211,687 | 7/1980 | Salee | 524/467 |

*Primary Examiner*—Melvyn I. Marquis
*Attorney, Agent, or Firm*—Connolly and Hutz

[57] ABSTRACT

A high molecular weight stabilized polymer composition containing p-polyphenylene sulfide and a siloxane.

5 Claims, No Drawings

USE OF SILOXANES FOR THE MODIFICATION OF HIGH MOLECULAR WEIGHT P-POLYPHENYLENE SULPHIDES

This invention relates to the use of siloxanes corresponding to the general formula (VIII):

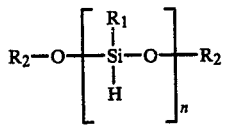
(VIII)

wherein
$R_1$ represents $C_1-C_{18}$ alkyl, $C_5-C_6$ cycloalkyl, $C_2-C_{18}$ alkenyl, $C_5-C_6$ cycloalkenyl or $C_6-C_{12}$ aryl,
$R_2$ has the same meaning as $R_1$ and may also represent trimethylsilyl, and
n represents an integer from 1 to 100,
for the modification of high molecular weight p-polyphenylene sulphides.

The invention also provides high molecular weight modified p-polyphenylene sulphides, characterised by a content of from 0.1 to 2% by weight, based on the total weight of the mixture of polyphenylene sulphide and siloxanes, of siloxanes corresponding to the formula (VIII):

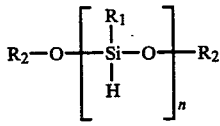
(VIII)

wherein $R_1$, $R_2$ and n are as defined above.

The invention further relates to the use of these modified high molecular weight p-polyphenylene sulphides, optionally together with additional siloxanes corresponding to formula (VIII), for the production of mixtures consisting of from 30 to 98% by weight of high molecular weight p-polyphenylene sulphide and from 2 to 70% by weight of a thermoplastic aromatic polycarbonate and/or thermoplastic polyester and/or thermoplastic aromatic polyester carbonate, in each case based on the total weight of the mixture of unmodified high molecular weight p-polyphenylene sulphide with polycarbonate and/or with polyester and/or with polyester carbonate, the content of siloxanes corresponding to formula (VVV):

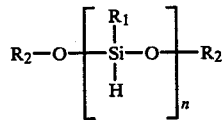
(VIII)

wherein $R_1$, $R_2$ and n are as defined above, in each case amounting to from 0.1 to 2% by weight, based on the total weight of the mixture consisting of siloxane and p-polyphenylene sulphide with polycarbonate and/or with polyester and/or with polyester carbonate.

The invention also provides a process for the stabilisation of mixtures consisting of from 98 to 30% by weight of high molecular weight p-polyphenylene sulphides and from 2 to 70% by weight of thermoplastic, aromatic polycarbonates and/or thermoplastic polyesters, and/or thermoplastic, aromatic polyester carbonates which is characterised in that from 0.1 to 2% by weight, based on the total weight of the mixture of siloxane and p-polyphenylene sulphide with polycarbonate and/or with polyester and/or with polyester carbonate, of a siloxane corresponding to formula (VIII):

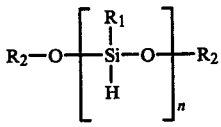
(VIII)

wherein $R_1$, $R_2$ and n are as defined above, are added to the components of the mixture or to the total mixture before or during thermoplastic processing thereof.

The complete mixture is processed generally in standard screw machines or in kneaders at a temperature of from 270° to 420° C.

The invention also provides mixtures which may be obtained according to the above-mentioned process.

The invention also provides mixtures consisting of from 0.1 to 2.0% by weight of siloxane corresponding to formula (VIII):

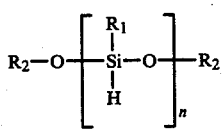
(VIII)

wherein $R_1$, $R_2$ and n are as defined above, and from 99.9 to 98.0% by weight of a mixture consisting of from 98 to 30% by weight of high molecular weight p-polyphenylene sulphide, and from 2 to 70% by weight of thermoplastic, aromatic polycarbonates and/or thermoplastic polyesters and/or thermoplastic, aromatic polyester carbonates.

This invention further relates to the use of the above-mentioned mixtures for the production of mouldings, films or fibres, optionally after the addition of other polymers, pigments, fillers, stabilisers and/or mould-release agents.

Siloxanes which are preferred are those corresponding to formula (VIII) wherein $R_1$ represents $C_1-C_4$ alky.

Siloxanes which are particularly suitable are those corresponding to formula (VIII) wherein $R_1$ represents $CH_3$ and $R_2$ represents $Si(CH_3)_3$.

n preferably represents values from 2 to 50.

The production of the siloxanes corresponding to formula (VIII) is known and is described, for example, in "Walter Noll, Chemie und Technologie der Silikone", Verlag Chemie, 2nd edition, 1968, pages 44 ff, 76 ff, 123–124, p. 127 and 175.

p-Polyphenylene sulphide and the production and use thereof is known. (For example see U.S. Pat. Nos. 2,538,941; 2,513,188; 3,354,129; 4,038,261; 4,038,259; 4,038,263; 4,038,262; 4,046,114; 5,038,260; 4,039,518; 4,116,947; DE-AS No. 2,453,749; DE-OS Nos. 2,623,363, 2,623,362; 2,623,333; 2,817,731; 2,930,710 and 2,930,797.

In many production processes for p-polyphenylene sulphides, a hardening or curing step must be subsequently effected to improve the property spectrum of the p-polyphenylene sulphides by chain lengthening and branching, (for example, see U.S. Pat. Nos. 3,717,620; 3,524,835 and 3,839,301).

Mixtures of p-polyphenylene sulphides with thermoplastic polycarbonates or thermoplastic polyesters and optionally other additives are also known (for example, see DE-OS No. 2,503,336 (Le A 16 232), Japanese Patent Application No. 133 612/74 (Mitsubishi Petro. Chem. Industries), U.S. Pat. No. 4,021,596, Japanese Patent Application Nos. 101 873/75 (Unitika KK), 132 827/76 (Sumitomo Chemical), 3103/77 (Unitika Ltd.) and 140 342/76 and U.S. Pat. No. 4,140,671).

The purpose of such mixtures is generally to reduce the tendency of p-polyphenylene sulphides to bittleness which is expressed in a relatively low impact strength or notched impact strength. However, a disadvantage of such mixtures is the fact that, during thermoplastic processing thereof, the mixture components, i.e. the polycarbonates or polyesters, are subject to a certain decomposition which has an unfavourable effect on the property level of the mixtures. Surprisingly, it has been found that the decomposition of the mixture components may be substantially avoided by the use according to the present invention of the siloxanes corresponding to formula (VIII).

It is known from U.S. Pat. No. 4,211,687 or DE-OS No. 2,833,024 that the addition of p-polyphenylene sulphide to aromatic polyesters improves the low hydrolytic stability thereof to boiling water (see, in particular, Examples 2 to 6). The fact that p-polyphenylene sulphides, as additives to polyesters and polycarbonates, cause a decomposition of the polyesters or polycarbonates during thermoplastic processing thereof is not mentioned in these references and is not even suggested by them.

During the simultaneous use of glass as fillers, organic silane compounds, among other substances, are used in a known manner as coupling agents. However, it could not be deduced from this that the siloxanes corresponding to formula (VIII) to be used according to this invention substantially prevent the above-mentioned decomposition of the mixture components.

Within the context of the present invention, p-phenylene sulphides are high molecular weight branched p-polyphenylene sulphides which are obtained by reacting together:

(a) dihalogenbenzenes, from 50 to 100 mol % of which correspond to formula (I):

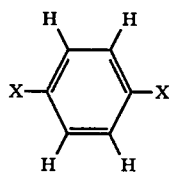

and from 0 to 50 mol % correspond to formula (II):

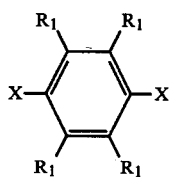

wherein
X in each position independently represents fluorine, chlorine, bromine and iodine, preferably chlorine and bromine, and
$R^1$ is the same or different at each position, and may represent hydrogen, $C_1$–$C_{20}$ alkyl, $C_5$–$C_{20}$ cycloalkyl, $C_6$–$C_{24}$ aryl, $C_7$–$C_{24}$ alkaryl or $C_7$–$C_{24}$ aralkyl, and/or two radicals $R^1$ may be linked to form an aromatic or heterocyclic ring, and at least one radical $R^1$ is always different from hydrogen;

(b) from 0.1 to 2.4 mol %, preferably from 0.4 to 2.0 mol %, based on the dihalogenbenzenes, of a polyhalogen aromatic compound corresponding to formula (III):

$$ArX_n \qquad \text{(III)}$$

wherein
Ar represents an aromatic or heterocyclic radical having from 6 to 24 carbon atoms,
X is as defined in formulae (I) and (II), and
n represents 3 or 4; and (c) an alkali metal sulphide, preferably sodium or potassium sulphide or a mixture thereof, preferably in the form of the hydrates or aqueous mixtures, optionally together with alkali metal hydroxides, for example sodium hydroxide, in a (d) polar solvent, the molar ratio of (a) to (c) ranging from 0.85:1 to 1.15:1, preferably from 0.95:1 to 1.05:1, and the molar ratio of (c) to (d) ranging from 1:2 to 1:15, the reaction being carried out according to the above-mentioned known processes, and the products being isolated in a known manner.

Examples of suitable p-dihalogen aromatic compounds corresponding to formula (I) include the following: p-difluorobenzene, p-dichlorobenzene, p-dibromobenzene, p-di-iodobenzene, 1-fluoro-4-chlorobenzene, 1-fluoro-4-bromobenzene, 1-chloro-4-bromobenzene, 1-chloro-4-iodobenzene and 1-bromo-4-iodobenzene. They may be used on their own or in admixture.

Examples of suitable p-dihalogen aromatic compounds corresponding to formula (II) include the following: 2,5-dichlorotoluene, 2,5-dichloroxylene, 1-ethyl-2,5-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene and 1-hexyl-2,5-dichlorobenzene. They may be used on their own or mixed together.

Examples of suitable polyhalogen aromatic compounds corresponding to formula (III) include the following: 1,2,3-trichlorobenzene, 1,2,4-trichlorobenzene, 1,2,4-tribromobenzene, 1,2,4-tri-iodobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene, 2,2'-4,4'-tetrachlorobiphenyl and 1,3,5-trichlorotriazine.

For a particular characterisation of the p-polyphenylene sulphides which are suitable according to this invention, the melt viscosity is determined at 306° C. (measured in Pa.s) depending on the shearing strain (measured in Pa) using an Instrom Rotation Viscosimeter (model 3250 manufactured by Instrom, diameter of the cone and the plate 2 cm).

p-Polyphenylene sulphides which have a melt viscosity of from $2\times10^o$ to $5\times10^4$ Pa.s, in particular from $5\times10^2$ to $2\times10^4$ Pa.s, are preferably suitable for the mixture according to the present invention.

High molecular weight, aromatic, thermoplastic polycarbonates within the context of the present invention are the known polycarbonates which are produced from diphenols, such as resorcinol, hydroquinone, from dihydroxy diphenylenes and, in particular from bis(hydroxyphenyl)-alkanes, for examples bis-(4-hydroxyphenyl)-propane-2,2 (Bisphenol A), bis-(4-hydroxy-3,5-dimethylphenyl)-propane-2,2, from trinuclear bisphenols such as α,α-bis-(4-hydroxyphenyl)-p-diisopropylbenzene, from halogenated bis(hydroxyphenyl)-alkanes, for example 4,4'-dihydroxy-3,5,3',5'-(tetrachlorodiphenyl-propane-2,2 or 4,4'-dihydroxy-3,5,3',5'-tetra-bromodiphenylpropane-2,2, bis-(hydroxyphenyl)-cycloalkanes, -sulphones, -sulphoxides, -ethers or -sulphides, optionally in admixture with glycols, with derivatives of carbon dioxide, for example with the diesters or dihalides thereof, and which have an average molecular weight ($\overline{M}w$) of at least about 10,000, preferably from about 20,000 to about 200,000, and in particular from 25,000 to 80,000, determined by measuring the relative viscosity in $CH_2Cl_2$ at 25° C. and in a concentration of 0.5% by weight.

Relevant references for suitable diphenols and polycarbonates include, for example, U.S. Pat. No. 3,028,365, DE-OS No. 2,063,050 and the monograph "H. Schnell, Chemistry and Physics of Polycarbonates, Interscience Publishers, New York, 1964".

Diphenols which are preferred for the polycarbonates which may be used according to the present invention include the following: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, 2,2-bis-(3,5-dichloro-4-hydroxyphenyl)-propane and 2,2-bis-(3,5-dibromo-4-hydroxyphenyl)-propane.

Diphenols which are particularly preferred include the following, for example: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis(3,5-dibromo-4-hydroxyphenyl)-propane, and 1,1-bis-(4-hydroxyphenyl)-cyclohexane.

Preferred aromatic polycarbonates are those which are based on one or more of the diphenols which have been mentioned as being preferred. Copolycarbonates are particularly preferred which are based on 2,2-bis-(4-hydroxyphenyl)-propane and on one of the other diphenols mentioned as being particularly preferred. Furthermore, those polycarbonates are particularly preferred which are only based on 2,2-bis-(4-hydroxyphenyl)-propane or 2,2-bis-(3,5-dimethyl-4-hydroxyphenyl)-propane.

The aromatic polycarbonates may be produced according to known processes, for example, by the melt transesterification process from bisphenol and diphenyl carbonate and by the two-phase interface process from bisphenols and phosgene, as described in the abovementioned literature.

The aromatic polycarbonates may be branched in a known manner by the incorporation of small quantities, preferably quantities of from 0.05 to 2.0 mol % (based on the diphenols used), of tri- or higher functional compounds, in particular compounds having three or more phenolic hydroxy groups.

Polycarbonates of this type are described, for example, in German Offenlegungsschrift Nos. 1,570,533; 1,595,762; 2,116,974; 2,113,347; in British Pat. No. 1,079,821, in U.S. Pat. No. 3,544,514 and in German Pat. No. 2,500,092.

Some of the compounds having three or more phenolic hydroxy groups which may be used include the following, for example: 2,4-bis(4-hydroxyphenyl-isopropyl)-phenol, 2,6-bis-(2'-hydroxy-5'-methyl-benzyl)-4-methylphenol, 2-(4-hydroxyphenyl)-2-(2,4-dihydroxyphenyl)-propane and 1,4-bis-(4,4''-dihydroxytriphenylmethyl)-benzene. Some of the other trifunctional compounds include 2,4-dihydroxybenzoic acid, trimesic acid, cyanuric chloride and 3,5-bis-(4-hydroxyphenyl)-2-oxo-2,3-dihydroindole.

Within the present context, thermoplastic polycarbonates may also be composed of mixtures of different polycarbonates, for example of such mixtures of very high molecular weight polycarbonates with normal high molecular weight polycarbonates according to DE-OS No. 2,729,763 (Le A 18 185), or of normal high molecular weight polycarbonates with small quantities of low molecular weight polycarbonates having $\overline{M}w<10,000$, in particular having polymerisation degrees of from 3 to 15.

Thermoplastic polyesters within the present context are aromatic polyesters and aliphatic polyesters and aromatic-aliphatic polyesters.

Aliphatic polyesters within the context of the present invention are selected from the family consisting of high molecular weight polymeric glycol terephthalates or isophthalates having recurring units corresponding to the general formula:

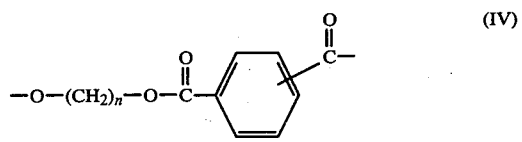

wherein n represents an integer from 2 to 6, and mixtures of such esters, including mixed polyesters of terephthalic acid and isophthalic acid.

Polyalkylene glycol terephthalates in the present context include, for example, those based on ethylene glycol, propanediol-1,3, butanediol-1,4 and hexanediol-1,6. The molecular weights ($\overline{M}w$) of these polyalkylene glycol terephthalates are from 10,000 to 80,000. They may be obtained according to known processes, for example, from terephthalic acid dialkylesters and the corresponding diol by transesterification (see, for example, U.S. Pat. Nos. 2,647,885; 2,643,989; 2,534,028; 2,578,660; 2,742,494 and 2,901,466). The starting material for the production of the polyalkylene glycol terephthalates is, for example, a low alkyl ester of terephthalic acid, preferably dimethyl ester, and this is transesterified with an excess of diol in the presence of suitable catalysts to produce bis-hydroxy alkyl ester of terephthalic acid. In this process, the temperature is increased from initially 140° C. to from 210° to 220° C. The alcohol which is released is distilled off. Condensation then takes place at a temperature of from 210° to 280° C., and the pressure is reduced in stages to less than 1 torr, the excess diol being distilled off.

The polyalkylene glycol isophthalates and the mixed polyesters of terephthalic acid and isophthalic acid may also be produced according to the above-described condensation process.

The molecular weights $\overline{M}w$ of the isophthalates are from 10,000 to 80,000 and the molecular weights $\overline{M}w$ of the mixed polyesters of terephthalic acid and isophthalic acid are from 10,000 to 100,000.

Aliphatic thermoplastic polyesters which are particularly preferred are polyethylene terephthalates having an $\overline{M}w$ of from 10,000 to 80,000, and polybutylene terephthalates having an $\overline{M}w$ of from 10,000 to 80,000.

Aromatic polyesters within the present context are those which are based on terephthalic acid and/or isophthalic acid and bisphenols having molecular weights ($\overline{M}w$. weight average) of from 10,000 to 100,000, in particular from 10,000 to 50,000, measured by gel chromatography according to known methods.

Mixtures of terephthalic acid dichloride and isophthalic acid dichloride in a mol ratio of from 7:3 to 3:7 are preferably used for the production of the aromatic polyesters used according to the present invention. Mixtures of terephthalic acid dichloride and isophthalic acid dichloride in a mol ratio of 1:1 are particularly used.

Diphenols which are suitable for the production of the aromatic polyesters are those corresponding to formula (V):

HO-Z-OH  (V)

wherein Z represents a divalent, mono- or polynuclear aromatic radical having from 6 to 30 carbon atoms, and diphenols which are preferred are those corresponding to formula (VI):

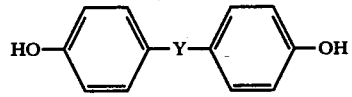 (VI)

wherein Y represents a single bond, an alkylene or alkylidene radical having from 1 to 5 carbon atoms, a cyclohexylene or cyclohexylidene radical, —O—, —S—, —SO—, —SO₂—, or —CO—.

Diphenols which are suitable for the production of the aromatic polyesters are, for example, the diphenols which have already been mentioned as being suitable for the production of the aromatic polycarbonates.

Diphenols which are preferred for the production of the aromatic polyesters include the following: bisphenol A=2,2-bis(4,4-dihydroxy-diphenyl)-propane, tetramethylbisphenol A, 1,1-bis-(4-hydroxyphenyl)-isobutane, 1,1-bis-(4-hydroxyphenyl)-cyclohexane, 4,4-dihydroxydiphenylsulphide, 4,4-dihydroxydiphenyl, 4,4-dihydroxydiphenyl sulphone and di- and tetra-halogenated derivatives thereof. Bisphenol A is particularly preferred. Any mixtures of the above-mentioned diphenols may also be used.

The aromatic polyesters may be produced by the phase interface process according to the reference W. M. Eareckson, J. Polymer Sci., XL, 399 (1959).

In this process, any phenols may be used as chain regulators, but particularly compounds corresponding to the formula (VII):

 (VII)

wherein
X represents OH, O-CO-Cl or COCL, and
R represents a branched alkyl radical having from 8 to 9 carbon atoms,
provided that, in the alkyl radical R, the proportion of methyl-hydrogen atoms, based on all the hydrogen atoms of the alkyl radical R, amounts to from 47 to 89%, that R is in the o- and/or p-position, and the upper limit of the o-isomer proportion is 20%. These compounds to be used as chain terminators are either known or are simple to produce (see DE-OS No. 2,940,024 [Le A 19 932] or DE-OS No. 2,842,005 [Le A 19 006]).

The aromatic polyesters which are suitable according to the present invention for the mixtures with polyphenylene sulphide may also be produced by melt condensation (see A. Conix, Ind. Eng.-Chem., 51, 147 (1959) or U.S. Pat. No. 3,395,119).

The thermoplastic aliphatic-aromatic polyesters also to be simultaneously used according to this invention as mixture components are known, for example, from U.S. Pat. No. 3,471,441.

The thermoplastic, aromatic polyester-polycarbonates also to be simultaneously used according to this invention as mixture components are known, for example, from DE-OS Nos. 2,009,494 (Le A 12 845) or 2,052,378 (Le A 13 349) or from the corresponding U.S. Pat. No. 3,729,447.

The mixtures according to the present invention are obtained by known processes by mixing in the melt, for example, by compounding in standard screw machines or kneading at a temperature of from 270° to 420° C.

During this operation, the individual constituents of the mixtures according to the present invention, i.e., the p-polyphenylene sulphide, the polymer mixture component or components and the siloxanes corresponding to formula (VIII), may be directly introduced together and then processed thermoplastically according to conventional processes, for example by extrusion, kneading or injection moulding. Any other form of metering is possible, for example the metered addition of an analogous mixture which is greatly enriched with the siloxane as a concentrate via a side extruder to the mixture of the thermoplasts in the extrusion, or the addition of the siloxanes via a metering apparatus attached to the extruder.

The production of the modified high molecular weight p-polyphenylene sulphides which, at the same time, are the preferred intermediate stage on the way to the production of the thermoplastic mixtures of the invention, comprises working the siloxanes corresponding to formula (VIII) into the p-polyphenylene sulphides, for example by extrusion or kneading at a temperature of from 290° to 400° C.

When p-polyphenylene sulphides are modified in this way with the siloxanes corresponding to formula (VIII), they have improved mechanical properties, for example an increased impact resistance compared to untreated p-polyphenylene sulphides, so that the commercial use thereof is superior to the known use of the known p-polyphenylene sulphides.

In the case of the p-polyphenylene sulphide mixtures obtained according to the present invention with polyesters and/or polycarbonates, a clearly reduced decomposition of the p-polyphenylene sulphide mixture component is established after thermoplastic processing when compared to non-siloxane-modified, analogous p-polyphenylene sulphide mixtures. Consequently, the p-polyphenylene sulphide mixtures which are obtained according to the present invention have an improved mechanical property spectrum when also compared to analogous mixtures obtained according to the prior art.

In order to examine the decomposition of the mixture components, the p-polyphenylene sulphide mixtures of the present invention are crushed and extracted, for example with chlorinated hydrocarbons, such as methylene chloride. The polycarbonates and polyesters thus extracted exhibit a higher solution viscosity and thus a higher molecular weight compared to polycarbonates and polyesters from polymer mixtures which are obtained analogously but not according to the present invention, i.e., without siloxane stabilisation.

The high molecular weight p-polyphenylene sulphides which are modified according to the present invention may be widely used commercially as such in a known manner where the hitherto known high molecular weight p-polyphenylene sulphides have been used for commercial purposes, preferably of course as mixture components in the mixtures of the present invention with thermoplastic polycarbonates and/or thermoplastic polyesters and/or thermoplastic polyester carbonates.

The thermoplast mixture according to the present invention may be directly processed by extrusion, extrusion blowing, injectin moulding or by other conventional processing techniques in a known manner into films, mouldings or fibres which are used in a conventional manner as car parts, fittings, electrical parts, parts in the electronic industry, chemical-resistant parts and apparatus, such as pump housings and pump impellers, etching bath trays, sealing rings, parts for office machines and communication devices as well as household gadgets, valves and ball bearing parts etc.

The mixtures according to the present invention may also be mixed with other polymers, with pigments and fillers, for example graphite, or metal powder, organic reinforcing fibres, for example Kevlar or carbon fibres, or mixed with additives which are conventional for polyphenylene sulphides or for thermoplastic polycarbonates or thermoplastic polyesters, for example known stabilisers or mould-release agents.

The polycarbonates which are used in the following Examples are aromatic homopolycarbonates.

Polycarbonate (PC) A: based on 2,2-bis-(4-hydroxyphenyl)-propane. Solution viscosity $\eta rel = 1.295$ (measured at 25° C. on a 0.5% methylene chloride solution).
Polycarbonate (PC) B: based on 2,2-bis-(3,5-dimethyl-4-hydroxyphenyl)-propane. Solution viscosity $\eta rel = 1.318$ (measured at 25° C. on a 0.5% methylene chloride solution).

Polyphenylene sulphide (PPS) C: a Ryton P4 ® produced by Phillips Petroleum Comp. was used as p-polyphenylene sulphide. Melt viscosity $\eta m$ at 306° C. at a shearing strain of $\tau = 10^2$ Pa: m=4500 Pa.s (measured with an Instron Viscosimeter).

Aromatic polyester (APE) D: the aromatic polyester is produced based on 2,2-bis-(4-hydroxyphenyl)-propane and on a 50/50 mixture of isophthalic acid chloride and terephthalic acid chloride. Solution viscosity $\eta rel = 1.312$ (measured at 25° C. on a 0.5% methylene chloride solution).

EXAMPLE 1 (Comparison)

50 g of standard p-polyphenylene sulphide C were melted in a laboratory kneader with 50 g of polycarbonate A for 30 minutes at 320° C. with the exclusion of air.

The molten block was then crushed very finely, and the polycarbonate was extracted from the mixture using methylene chloride.

The relatively solution viscosity $\eta rel$ (measured at 25° C. on 0.5% solutions of polycarbonate in methylene chloride) was determined before and after compounding as a measurement of the molecular weight decomposition of the polycarbonate.

|  |  | Decomposition of polycarbonate $\eta$ rel | |
|---|---|---|---|
|  |  | before | after |
| 50 g polycarbonate A | 50 g polyphenylene sulphide C 320°/30' | 1.295 | 1.192 |

After melting with PPS C which was not stabilised according to the present invention, a molecular weight decomposition in the polycarbonate was clearly shown.

EXAMPLE 2 (Comparison)

Polycarbonate A and PPS C were melted together in the same apparatus at 320° C. for different periods of time with the exclusion of air. They were worked up analogously to Example 1.

As may be seen from Table 1, an ever increasing polycarbonate decomposition is noted with longer periods of time.

TABLE 1

| PPS | PC | Time/Temp. | Decomposition of polycarbonate $\eta$ rel | |
|---|---|---|---|---|
|  |  |  | before | after |
| 50 g PPS C | 50 g Polycarbonate A | 30'/320° C. | 1.295 | 1.192 |
| " | 50 g Polycarbonate A | 60'/320° C. | 1.295 | 1.179 |
| " | 50 g Polycarbonate A | 120'/320° C. | 1.295 | 1.150 |
| " | 50 g Polycarbonate A | 240'/320° C. | 1.295 | 1.047 |

EXAMPLE 3

The apparatus and method were the same as for Example 2, but 0.5% by weight, based on the total weight of the polycarbonate/p-polyphenylene sulphide mixture, of a poly-(methyl-H-siloxane) corresponding to formula (VIII) ($R_1=CH_3, R_2=Si(CH_3)_3$·n = 10 to 12) were also added. A clearly lower polycarbonate decomposition could be established compared to the siloxane-free mixtures of Example 2.

TABLE 2

| PPS | PC | Siloxane* | Decomposition of Polycarbonate $\eta$ rel | |
|---|---|---|---|---|
| | | | before | after |
| 50 g PPS C | 50 g PC A 30'/320° C. | 0.5% by weight | 1.295 | 1.252 |
| 50 g PPS C | 50 g PC A 60'/320° C. | " | 1.295 | 1.252 |
| 50 g PPS C | 50 g PC A 120'/320° C. | " | 1.295 | 1.223 |
| 50 g PPS C | 50 g PC A 240'/320° C. | " | 1.295 | 1.183 |

*Poly-(methyl-H—siloxane) of formula (VIII) ($R_1 = CH_3$, $R_2 = Si(CH_3)_3$, n = 10 to 12).

EXAMPLE 4 (Comparison)

The procedure was the same as in Example 1, but instead of PC A, the same quantity of an aromatic polyester (APE D) was used which was obtained by a two phase interface condensation of bisphenol A and a 50/50 mixture of terephthalic acid chloride and isophthalic acid chloride according to a conventional process using p-isooctylphenol as the chain terminator. Relative solution viscosity $\eta$rel of the APE D: 1.312.

| | | Decomposition of APE $\eta$ rel | |
|---|---|---|---|
| | | before | After |
| 50 g APE D + 50 g PPS C | 320° C./30' | 1.312 | 1.203 |

EXAMPLE 5

The procedure was as in Example 4, but with 0.5% by weight, based on the total weight of the mixture, of the siloxane used in Example 3.

| | | Siloxane* | Decomposition of APE $\eta$ rel | |
|---|---|---|---|---|
| | | | before | after |
| 50 g APE D + 50 g PPS C | 320° C./30' | 0.5% by weight | 1.312 | 1.254 |

*see Table 2.

A clearly lower decomposition of the polyester is noted in the presence of the siloxane.

EXAMPLE 6

The procedure was as in Example 1, but instead of PC A, the same quantities of a polycarbonate based on bis-(3,5-dimethyl-4-hydroxyphenyl)-propane (PC B) were used. PC B $\eta$rel: 1.318.

| | | Decomposition of methyl-polycarbonate $\eta$ rel | |
|---|---|---|---|
| | | before | after |
| 50 g PC B + 50 g PPS C | 320°/30' | 1.318 | 1.236 |

EXAMPLE 7

The procedure was as in Example 6, but with the addition of 0.5% by weight, based on the total weight of the mixture, of the siloxane used in Example 3.

| | | Decomposition of methyl-polycarbonate $\eta$ rel | |
|---|---|---|---|
| | | before | after |
| 50 g PC B + 50 g PPS C | 0.5% by weight of siloxane* | 1.318 | 1.276 |

Compared to Example 6, the decomposition of the polycarbonate is reduced by the pressure of the siloxane.

EXAMPLE 8

50 g each of PC A and PPS C are melted at 320° C. for 30 minutes in the presence of increasing quantities of the siloxane used in Example 3, with the exclusion of air, and the decomposition of the polycarbonate portion was tested according to Example 1. The polycarbonate decomposition may be reduced to a greater extent using increasing quantities of siloxane.

| PC-A | PPS-C | Siloxane* | Decomposition of Polycarbonate $\eta$ rel | |
|---|---|---|---|---|
| | | | before | after |
| 50 g | 50 g | 0.125 | 1.295 | 1.231 |
| 50 g | 50 g | 0.250 | 1.295 | 1.238 |
| 50 g | 50 g | 1.50 | 1.295 | 1.252 |
| 50 g | 50 g | 1.00 | 1.295 | 1.258 |

EXAMPLE 9

The procedure was as in Example 5, but instead of the polysiloxane of Example 3, a poly-(methyl-H-siloxane) corresponding to formula (VIII) ($R_1=CH_3$, $R_2=Si(CH_3)_3$ and n~50) was used. The relative solution viscosity of the aromatic polyester decreased from 1.312 to 1.248. The stabilising effect of the two poly-(methyl-H-siloxanes) is comparable therewith.

EXAMPLE 10

50 g of PPS C were melted with 1% by weight of the siloxane of Example 3 for 30 minutes at 320° C. with the exclusion of air. The PPS-C thus pretreated was then melted together with 50 g of polycarbonate A at 320° C. for 30 minutes with the exclusion of air. The decomposition of the polycarbonate is even lower, compared to a method in which polycarbonate, stabiliser and p-polyphenylene sulphide are directly melted together (see Example 3). The decomposition of the polycarbonate was measured via the decrease in the relative solution viscosity, from $\eta$rel 1.295 to $\eta$rel 1.260.

EXAMPLE 11

90% by weight of PPS C are extruded with 10% by weight of the aromatic polyester PE D using a double shaft screw at a mass temperature of 331° C. The mixture resulting as granulated material was injected into shoulder rods and the mechanical properties were determined. The same experiment was repeated, but 0.25% by weight, based on the total weight of the mixture, of the polysiloxane of Example 3 were also added. In Table 3, the mechanical properties of the two mixtures are compared. The mechanical properties of the p-polyphenylene sulphide mixtures which are stabilised according to the present invention are clearly better. In particular, the impact resistance, which is important for p-polyphenylene sulphides, is improved by the addition of the siloxane of the present invention by an increase from 3.43 kJ/m² to 11.30 kJ/m².

TABLE 3

| Properties | Unit of measurement | APE/PPS mixtures without siloxane | APE/PPS mixtures with siloxane |
|---|---|---|---|
| Tearing resistance | M Pa | 26.55 | 61.87 |
| Elongation at tear | % | 0.65 | 1.56 |
| Tension-E-modulus | M Pa | 4090 | 4230 |
| Flexural strength | M Pa | 70.25 | 111.94 |
| Flexural-E-modulus | M Pa | 3688 | 3616 |
| Impact strength | kJ/m² | 3.43 | 11.30 |
| Notched impact strength | kJ/m² | 0.84 | 0.90 |

EXAMPLE 12

Mixtures of 50% of PPS C and 50% of polycarbonate B of Example 6 were extruded by a double shaft screw, in one case with and in a second case without 0.25% by weight, based on the total weight of the mixture, of the polysiloxane of Example 3, and were then injected into shoulder rods. The impact strength $a_n$ was 8.46 kJ/m² without the siloxane stabilisation, and was 14.51 kJ/m² with the siloxane stabilisation.

We claim:

1. High molecular weight stabilized polymer composition comprising p-polyphenylene sulphide having a content of from 0.1 to 2% by weight, based on the total weight of the composition, of a siloxane of the formula

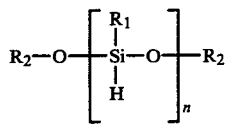

wherein
R₁ represents a $C_1$-$C_{18}$ alkyl, $C_5$-$C_6$ cycloalkyl, $C_2$-$C_{18}$ alkenyl, $C_5$-$C_6$ cycloalkenyl or $C_6$-$C_{12}$ aryl,
R₂ has the same meaning as R₁ and may represent trimethylsilyl, and
n represents an integer from 1 to 100.

2. The high molecular weight composition according to claim 1 wherein the composition comprises 98 to 30% by weight of p-polyphenylene sulphide,
2-70% by weight of thermoplastic aromatic polycarbonate, thermoplastic polyester, thermoplastic aromatic polyester carbonate, or a mixture thereof, and
0.1 to 2% by weight of said siloxane.

3. A process for the stabilization of a composition containing from 98 to 30% by weight of high molecular weight p-polyphenylene sulphides and from 2 to 70% by weight of thermoplastic, aromatic polycarbonates, thermoplastic polyesters, thermoplastic aromatic polyester carbonates or a mixture thereof which comprises blending into the polymer components or a mixture of the polymer components from 0.1 to 2% by weight, based on the total weight of the composition, of a siloxane of the formula

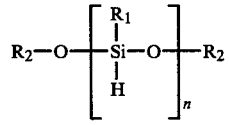

wherein
R₁ represents $C_1$-$C_{18}$ alkyl, $C_5$-$C_6$ cycloalkyl, $C_2$-$C_{18}$ alkenyl, $C_5$-$C_6$ cycloalkenyl or $C_6$-$C_{12}$ aryl,
R₂ has the same meaning as R₁ and may also represent trimethylsilyl, and
n represents an integer from 1 to 100.

4. A mixture consisting essentially of from 0.1 to 2% by weight of siloxane corresponding to the formula

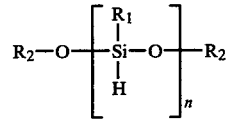

wherein
R₁ represents $C_1$-$C_{18}$ alkyl, $C_5$-$C_6$ cycloalkyl, $C_2$-$C_{18}$ alkenyl, $C_5$-$C_6$ cycloalkenyl or $C_6$-$C_{12}$ aryl,
R₂ has the same meaning as R₁ and may also represent trimethylsilyl, and
n represents an integer from 1 to 100, and
from 99.9 to 98.0% by weight of a mixture consisting essentially of from 98 to 30% by weight of high molecular weight polyphenylene sulphide, and
from 2 to 70% by weight of thermoplastic, aromatic polycarbonates, thermoplastic polyesters, thermoplastic, aromatic polyester carbonates or a mixture thereof.

5. Mixtures which may be obtained according to the process of claim 3.

* * * * *